United States Patent
Graf et al.

(10) Patent No.: US 7,216,032 B2
(45) Date of Patent: May 8, 2007

(54) DATA STORAGE SYSTEM FOR A MOTOR VEHICLE AND METHOD FOR STORING DATA IN A MOTOR VEHICLE

(75) Inventors: Friedrich Graf, Sinzing (DE); Martin Lachmayr, Regensburg (DE); Martin Manz, Bietigheim-Bissingen (DE); Oliver Nelles, Regensburg (DE); Gregor Probst, Landshut (DE); Tanja Roy, Holzheim am Forst (DE)

(73) Assignee: Siemens Aktiengesellschaft, Munich (DE)

( * ) Notice: Subject to any disclaimer, the term of this patent is extended or adjusted under 35 U.S.C. 154(b) by 479 days.

(21) Appl. No.: 10/682,241

(22) Filed: Oct. 9, 2003

(65) Prior Publication Data

US 2004/0117083 A1 Jun. 17, 2004

Related U.S. Application Data

(63) Continuation of application No. PCT/DE02/00886, filed on Mar. 13, 2002.

(30) Foreign Application Priority Data

Apr. 9, 2001 (DE) ................................ 101 17 681

(51) Int. Cl.
 *G01C 21/30* (2006.01)
(52) U.S. Cl. ..................... 701/200; 701/208; 701/210; 701/35; 340/995.18

(58) Field of Classification Search ............ 701/23–25, 701/36, 200–202, 208, 35, 210; 340/988, 340/995.1, 995.18
See application file for complete search history.

(56) References Cited

U.S. PATENT DOCUMENTS

| 5,558,178 A | 9/1996 | Hess et al. .................. 180/197 |
| 6,173,277 B1 | 1/2001 | Ashby et al. .................. 707/1 |
| 6,199,008 B1 * | 3/2001 | Aratow et al. .............. 701/120 |

FOREIGN PATENT DOCUMENTS

| DE | 197 28 925 A1 | 1/1999 |
| DE | 197 28 083 A1 | 2/1999 |
| DE | 197 36 231 C2 | 3/2000 |
| DE | 198 39 193 A1 | 3/2000 |
| EP | 0 982 700 A2 | 7/1999 |
| EP | 1 034 982 A2 | 3/2000 |

* cited by examiner

*Primary Examiner*—Y. Beaulieu
(74) *Attorney, Agent, or Firm*—Baker Botts L.L.P.

(57) ABSTRACT

A data storage system for a motor vehicle has at least two control units (1) for controlling one or several vehicle components each, at least two memories (2) for storing data that characterize the route to be traveled on in future, and an interface (3) to a data source (4). Every control unit (1) inquires with the data source (4) a subset of the route data contained therein via the interface (3) and stores the route data transmitted in response in the memory (2) associated with the respective control unit (1).

14 Claims, 1 Drawing Sheet

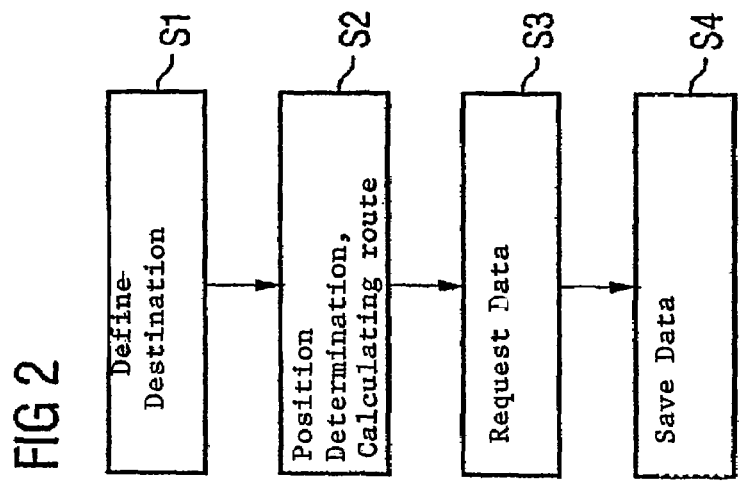
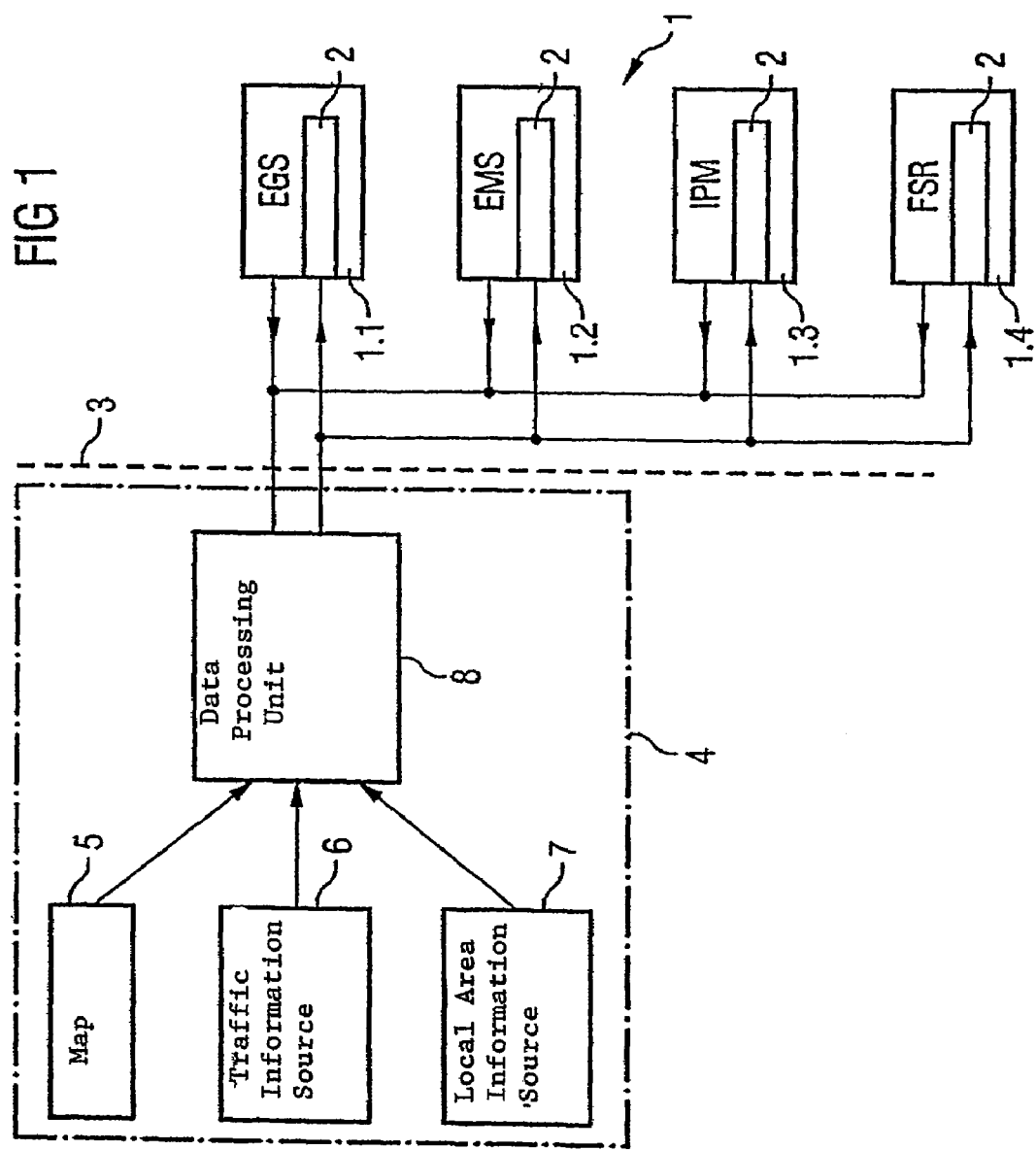

US 7,216,032 B2

DATA STORAGE SYSTEM FOR A MOTOR VEHICLE AND METHOD FOR STORING DATA IN A MOTOR VEHICLE

CROSS REFERENCE TO RELATED APPLICATION

This application is a continuation of copending International Application No. PCT/DE02/00886 filed Mar. 13, 2002, which designates the United States, and claims priority to German application number 10117681.3 filed Apr. 9, 2001.

TECHNICAL FIELD OF THE INVENTION

The invention relates to a data storage system for a motor vehicle and a method for storing data characterizing a motor vehicle's future route.

BACKGROUND OF THE INVENTION

An increasing number of motor vehicles are fitted with navigation systems. When the destination has been specified, the system automatically calculates the correct route to be traveled and reliably guides drivers to their destination by means of optical and/or acoustic directions. The basis for this is usually a digitized road map stored on a CD-ROM that encompasses the road network as comprehensively as possible. Proceeding from the position of the driver's own vehicle within the digitized road map, the route to be traveled is calculated and, as and when required, recommendations to turn off are given that correspond to the respective situation.

Apart from information on the road network itself, modern navigation systems also offer information, for example about the curve characteristics of and distance to a bend being traveled, which characterizes the route being traveled in greater detail. This route data can be made available to the driver or to driver assistance systems. The route data can, however, also be transmitted directly to control units for controlling vehicle components such as the engine or gears. However, increasing volumes of data give rise to substantial storage and communication requirements in the motor vehicle. This calls for high-capacity memories and efficient data networks which are expensive.

SUMMARY OF THE INVENTION

The object of the invention is therefore to provide a data storage system for a motor vehicle and a method for storing data in a motor vehicle which significantly reduces the required storage capacity in the motor vehicle and/or minimizes the communication requirements between individual vehicle components.

These objects can be achieved by a data storage system for a motor vehicle comprising at least two control units for controlling in each case one or more vehicle components, at least two memories for storing data characterizing the future route being traveled, an interface to a data source, wherein each control unit is able, via the interface, to request from the data source a subset of the route data available there and to store the consequently transmitted route data in the memory assigned to the relevant control unit.

The objects can also be achieved by a data storage system for a motor vehicle comprising a data source, an interface coupled to the data source, two control units coupled to the interface, each comprising a memory for storing data characterizing the future route being traveled, for controlling in each case one or more vehicle components, wherein each control unit is operable, via the interface, to request from the data source a subset of the route data available there and to store the consequently transmitted route data in the memory of the respective control unit.

The data source can be located inside the motor vehicle or at least partially outside the motor vehicle. The route data can be transmitted at least partially on a wireless basis. The data source may have a data processing unit by which the route data can be selected, combined, classified, and/or compressed.

The objects may also be achieved by a method for storing data characterizing the future route in a motor vehicle comprising the steps of:

requesting in each case a subset of the data which is available in a data source and which characterizes the future route being traveled by at least two control units, transmitting the requested route data from the data source via an interface to the relevant control unit, and storing the route data in a memory assigned to the relevant control unit.

The route data transmitted from the data source can be further processed in the relevant control unit before being stored in the assigned memory. The route data can be transmitted at least partially on a wireless basis. The data source may select, combine, classify, and/or compress the route data.

The communication requirements within the motor vehicle are substantially reduced through central storage of the route data in the control units in the performance of whose control functions this data has to be taken into account. If the data source is located at least partially outside the motor vehicle, the volume of data stored in the motor vehicle can be matched to the route being traveled and to the relevant vehicle's configuration and consequently generally substantially reduced. A large amount of unneeded or non-processable route data is available in the data source depending on the route being traveled and on the vehicle's configuration. Nonetheless storing this data in the motor vehicle simply gives rise to additional storage requirements and hence to increased costs. Moreover, much of this data is valid for a short period only, for example in the event of tailbacks and new traffic routing.

BRIEF DESCRIPTION OF THE DRAWING

An exemplary embodiment of the invention is described below with the reference to the figure. The figure contains a schematic representation of a data storage system for a motor vehicle.

DETAILED DESCRIPTION OF THE PREFERRED EMBODIMENTS

Control units 1 serve to control one or more components of the motor vehicle (FIG. 1). The terms 'control unit' and 'control' are not, however, to be interpreted in a restrictive sense and should be understood as also including regulating units and processes. The control units 1 can be directly assigned to a vehicle component and have a controlling effect on this. Examples of this shown are an electronic transmission control (EGS) 1.1 by which the shifting operations of an automatic or automated gearbox are controlled, and an electronic engine control (EMS) 1.2 by which the variables affecting an engine's torque are controlled. Furthermore, the control units 1 can also perform higher-order control functions, thereby directly or indirectly also controlling several vehicle components. Examples of these shown are a shift control or IPM® control 1.3 which controls the powertrain on an integrated, which is to say comprehensive, basis (IPM® stands for Integrated Powertrain Management) and, in particular, determines the gear shifting strategy, and a driving stability control (FSR) 1.4 which can also include an anti-skid system and/or traction control.

Each of the control units 1 is assigned a memory 2 in the form, for example, of a RAM memory or hard disk, for storing data characterizing the future route being traveled. The memories 2 are advantageously integrated in the relevant control unit. The stored route data is processed and/or evaluated by the relevant control units 1 and taken into account in controlling the assigned vehicle components.

In addition to the control units 1 shown, other control units in a motor vehicle such as a speed controller, distance controller or battery management system, can be fitted with corresponding memories 2 in order to take information about the future route being traveled into account in the relevant control function.

Data characterizing the future route being traveled can be requested by the individual control units 1 from a data source 4 via an interface 3. Each control unit 1 in each case only requests a subset of the route data available in the data source 4. In particular, a control unit 1 requests the specific route data to be taken into account in the control functions of the relevant control unit 1. To express it simply, it is initially assumed that any information about the future route being traveled is available in the data source 4. At the request of a control unit 1, the requested route data is transmitted from the data source 4 via the interface 3 to the control unit 1 and stored in the assigned memory 2.

The data source 4 has a digitized road map 5. The term 'road map' as employed here is not intended to be restrictive: alongside information simply about the directional course of roads, the digitized road map can include any supplementary information about the roads or routes being traveled. The available route information can be divided into three categories:

a) Route Profile Information

In terms of the route profile, both the horizontal course (such as bends or turn-offs) and the vertical course (gradients) are of importance.

b) Traffic Regulation Information

In terms of traffic regulation, information influencing the speed of the motor vehicle, for example speed limits, stop signs, right-of-way regulations or place name signs, is of particular importance.

c) Information on the Nature and Constitution or Condition of the Route

Information on the nature of the route (freeway, country road or through road) plays a crucial role in the control of certain vehicle components. Information about the constitution or condition of roads (asphalt, gravel, poor condition, potholes) is also desirable.

Apart from the road map 5, the data source 4 advantageously also has a traffic information source 6 providing up-to-date values for variables in terms of the route being traveled. The following information offers conceivable instances of this:

information on traffic flow (such as up-to-date tailback reports),
information on currently occurring changes to road conditions (such as black ice),
information on current or anticipated weather conditions, for example those affecting visibility (precipitation, fog, weather forecast),
information on the current functional status of traffic control systems (such as the current phase of traffic lights),
information on exceptional traffic control measures (such as temporarily closed roads or environmentally based regulations on low-emission operation).

The data source 4 can furthermore have a locality information source 7 in the form, for instance, of a camera in conjunction with an image-processing system or radar system, attached to the vehicle on a single or multiple basis. It is possible with the aid of such a locality information source 7 on the one hand to obtain vehicle-specific information about the route being traveled. Obstacles on the route, for example, in the simplest instance a vehicle traveling ahead, can be detected. On the other hand information not made available by the data sources 5 and 6, or made available by these incompletely or incorrectly, can be beneficially supplemented, corrected or replaced.

The vehicle-specific information obtained with the aid of the locality information source 7 about the route being traveled, and also supplemented or corrected information from the data sources 5 and 6, can be advantageously at least partially transmitted to the data sources 5 and 6 in order to update the relevant database.

The data source 4 also has a data processing unit 8. The data processing unit 8 selects the route data supplied by the data sources 5, 6, and 7 as required, and combines, classifies and/or compresses it. The current vehicle position is also determined in the data processing unit 8. Below are examples of the methods that can be employed, also in combination, to determine the vehicle position as accurately as possible:

positioning via GPS (Global Positioning System, satellite positioning),
coupling navigation from the current status data of the vehicle (yaw angle and vehicle speed),
differential wheel sensor data,
compass data, and/or
various map-matching algorithms.

The data source 4 can be provided inside the vehicle (on board), but it can also be located entirely or partially outside the motor vehicle (off board). If the data source 4 is located at least partially outside the motor vehicle, the data is transmitted to the motor vehicle on a wireless basis, for example by means of radio transmission with the aid of GSM or UMTS signals. Inside the motor vehicle the data can be transmitted either on lines, for example in the form of a data bus system, or by means of wireless transmission techniques. The type of data transmission is irrelevant to the functioning of the data storage system according to the invention. Depending on the configuration of the data source 4, the request signals can also be transmitted at least partially on a wireless basis from the control units 1 to the data source 4. FIG. 1 shows all data transmission paths in a simplified form as lines, but this representation is not intended to be restrictive.

The route data requested by a control unit 1 is advantageously edited in the data processing unit 8 in such a way that it can be immediately stored in the memory 2 assigned to the control unit 1 and can be taken into account by the control unit 1 immediately when the respective control function is performed. In an alternative embodiment the route data transmitted by the data source 4 can, however, also be further processed in the control unit 1 either before the route data is stored or before the route data is processed in the control of the assigned vehicle components. It is accordingly conceivable, for instance, that a control unit 1 requesting data via the interface 3 from data source 4 about future bends to be traveled will only be sent information about the x and y coordinates of the future route. The coordinates will then be evaluated by the control unit 1 and converted into the required bend data, for example distance and curvature.

A process cycle of a storage procedure is described below with the aid of a flow chart (FIG. 2):

At the start of a travel cycle, in a step S1 the destination is entered by the driver via an input module. The motor vehicle's current position is determined in a step S2 and the route to be traveled calculated as a function of this. In a step S3, in each case specific subsets of the route data available in the data source 4 are requested by the individual control units 1. Each control unit only requests the specific route data from the data source 4 that is significant for implementing the respective control function. For instance the transmission control 1.1 requests in particular route data influencing the shifting operations of the automatic or automated gearbox, for example data about bends or turn-offs ahead and about gradients ahead. Engine control 2 can, for example, request route data that is to be taken into account in regenerating the catalytic converter. The driving stability system 1.4 consistently only requests route data influencing the motor vehicle's stability, for example data about the road condition, coefficient of friction or bends ahead. In a step S4, the route data supplied by the data source 4 in response to the relevant request is stored in the memory 2 assigned to the respective control unit 1. The stored route data can then be taken into account in the performance of the relevant control functions of the control units 1.

The volume of data requested by the control units 1 should beneficially be adapted to the storage capacity of the respective assigned memory. Depending on storage capacity, length and complexity of the route being traveled, multiplicity of route data to be taken into account in the control function of the individual control unit 1, and the amount of memory required for the individual route data, frequently only the route data of part of the overall route being traveled is requested by the control units 1 and stored in the assigned memory 2. At the appropriate time, which is to say promptly prior to departure from the addressed partial route, the route data of the following part of the route being traveled is then requested. Recent changes to the route data that are made available by the traffic information source 6 or the locality information source 7 must also be taken into account independently of a route data request by a control unit 1. For this, the changed route data is either transmitted directly to the control units 1 or a signal signaling a change to route data is transmitted to the control units 1. The signal advantageously also contains information indicating which route data is affected by the change. The control units 1 can request new data if the route data currently stored on the respective memory 2 is affected by the change.

The invention claimed is:

1. Data storage system for a motor vehicle comprising:
   at least two control units for controlling one or more vehicle components, respectively,
   at least two memories for storing data characterizing a future route being traveled,
   an interface to a data source,
   wherein each control unit is able, via the interface, to request from the data source a subset of the route data available there and to store the consequently transmitted route data in the memory assigned to the relevant control unit.

2. Data storage system according to claim 1, wherein the data source is located inside the motor vehicle.

3. Data storage system according to claim 1, wherein the data source is located at least partially outside the motor vehicle.

4. Data storage system according to claim 1, wherein the route data is transmitted at least partially on a wireless basis.

5. Data storage system according to claim 1, wherein the data source has a data processing unit by which the route data can be selected, combined, classified, or compressed.

6. Method for storing data characterizing a future route in a motor vehicle comprising the steps of:
   requesting in each case a subset of the data which is available in a data source and which characterizes the future route being traveled by at least two control units for controlling one or more vehicle components, respectively,
   transmitting the requested route data from the data source via an interface to the relevant control unit, and
   storing the route data in a memory assigned to the relevant control unit.

7. Method according to claim 6, wherein the route data transmitted from the data source is further processed in the relevant control unit before being stored in the assigned memory.

8. Method according to claim 6, wherein the route data is transmitted at least partially on a wireless basis.

9. Method according to claim 6, wherein the data source selects, combines, classifies, or compresses the route data.

10. Data storage system for a motor vehicle comprising:
    a data source,
    an interface coupled to the data source,
    two control units coupled to the interface, each comprising a memory for storing data characterizing a future route being traveled, for controlling one or more vehicle components, respectively,
    wherein each control unit is operable, via the interface, to request from the data source a subset of the route data available there and to store the consequently transmitted route data in the memory of the respective control unit.

11. Data storage system according to claim 10, wherein the data source is located inside the motor vehicle.

12. Data storage system according to claim 10, wherein the data source is located at least partially outside the motor vehicle.

13. Data storage system according to claim 10, wherein the route data is transmitted at least partially on a wireless basis.

14. Data storage system according to claim 10, wherein the data source has a data processing unit by which the route data can be selected, combined, classified, or compressed.

* * * * *